US012781130B2

(12) United States Patent
Williams

(10) Patent No.: US 12,781,130 B2
(45) Date of Patent: Nov. 3, 2026

(54) SOLID WASTE PROCESSING APPARATUS

(71) Applicant: Cranfield University, Cranfield (GB)

(72) Inventor: Leon Matthew Williams, Cranfield (GB)

(73) Assignee: Cranfield University, Cranfield (GB)

( * ) Notice: Subject to any disclaimer, the term of this patent is extended or adjusted under 35 U.S.C. 154(b) by 338 days.

(21) Appl. No.: 18/686,209

(22) PCT Filed: Aug. 22, 2022

(86) PCT No.: PCT/GB2022/052161
§ 371 (c)(1),
(2) Date: Feb. 23, 2024

(87) PCT Pub. No.: WO2023/026030
PCT Pub. Date: Mar. 2, 2023

(65) Prior Publication Data

US 2026/0159761 A1 Jun. 11, 2026

(30) Foreign Application Priority Data

Aug. 24, 2021 (GB) ...................................... 2112131

(51) Int. Cl.

| | |
|---|---|
| ***C10B 57/14*** | (2006.01) |
| ***B01D 53/18*** | (2006.01) |
| ***C10B 47/34*** | (2006.01) |
| ***C10B 53/00*** | (2006.01) |
| ***C10B 57/10*** | (2006.01) |
| ***F23G 5/027*** | (2006.01) |
| *A47K 11/02* | (2006.01) |

(52) U.S. Cl.
CPC .............. *C10B 57/14* (2013.01); *B01D 53/18* (2013.01); *C10B 47/34* (2013.01); *C10B 53/00* (2013.01); *C10B 57/10* (2013.01); *F23G 5/027* (2013.01); *A47K 11/023* (2013.01); *B01D 2252/103* (2013.01); *B01D 2258/0291* (2013.01)

(58) Field of Classification Search
CPC ......... B01D 53/18; C10B 47/34; C10B 53/00; C10B 57/10; C10B 57/14; F23G 5/027
See application file for complete search history.

(56) References Cited

U.S. PATENT DOCUMENTS 4,561,132 A * 12/1985 Lew ....................... A47K 11/02 4/321
5,068,926 A * 12/1991 Suzuki ................. A47K 11/023 4/111.5
(Continued)

FOREIGN PATENT DOCUMENTS

CN 104415965 A 3/2015
CN 214457774 U 10/2021
(Continued)

OTHER PUBLICATIONS

Espacenet Machine Translation of CN104415965 Obtained Mar. 17, 2026. (Year: 2026).*

*Primary Examiner* — Jonathan Miller
(74) *Attorney, Agent, or Firm* — KIRTON McCONKIE; Evan R. Witt

(57) ABSTRACT

A solid waste treatment module (10) configured for the pyrolysis and preferably torrefaction of biomass such as human solid waste. A liquid based emission scrubber unit (15) is coupled directly to a pyrolysis unit (16).

25 Claims, 7 Drawing Sheets

(56) References Cited

U.S. PATENT DOCUMENTS

| | | | | |
|---|---|---|---|---|
| 5,152,074 | A * | 10/1992 | Kishi | F26B 25/005<br>219/652 |
| 5,276,924 | A * | 1/1994 | Hachima | A47K 11/02<br>4/111.1 |
| 5,462,676 | A * | 10/1995 | Pitts | F23G 5/18<br>210/103 |
| 6,139,744 | A * | 10/2000 | Spears | A47K 11/023<br>210/201 |
| 6,517,711 | B1 * | 2/2003 | Rummler | B01D 29/66<br>210/185 |
| 6,585,899 | B1 * | 7/2003 | Edvardsson | A47K 11/023<br>210/748.11 |
| 6,874,434 | B1 * | 4/2005 | Bigelow | F23G 5/033<br>110/218 |
| 2001/0047538 | A1 * | 12/2001 | Motoyama | E03D 5/00<br>4/300 |
| 2020/0337508 | A1 * | 10/2020 | Engineer | F26B 5/14 |
| 2021/0252446 | A1 * | 8/2021 | Dueck | B01D 46/16 |

FOREIGN PATENT DOCUMENTS

| | | | |
|---|---|---|---|
| JP | S55107296 | U | 7/1980 |
| JP | H04219190 | A | 8/1992 |
| WO | 9305694 | A1 | 4/1993 |

* cited by examiner

SOLID WASTE PROCESSING APPARATUS

FIELD OF INVENTION

The present invention relates to solid waste processing apparatus and in particular, although not exclusively, to apparatus and methods to thermally decompose predominantly solid human waste by pyrolysis.

BACKGROUND

According to the World Health Organisation as reported in June 2019, around 2 billion people do not have basic sanitation facilities such as toilets or latrines. Of these, an estimated 673 million defecate in the open, for example in street gutters, behind bushes or into open bodies of water. Poor sanitation is linked to transmission of diseases such as cholera, diarrhoea, dysentery, hepatitis A, typhoid and polio. In particular, inadequate sanitation, is estimated to cause around 432 k diarrhoea deaths annually. Additionally, poor sanitation has been proven to reduce human wellbeing and social and economic development.

Attempts to address the various problems associated with no or little sewage infrastructure has included with the use of non-flushing or chemical toilets and that may be conveniently supplied and installed in remote and rural communities. It is generally required that such toilets be environmentally friendly, can be easily maintained and require low energy consumption.

Non-flushing toilets have existed for many years including for example incinerator toilets as described within U.S. Pat. Nos. 3,020,559 and 3,230,913. These types of toilet use a coiled electrical heating element to incinerate/burn the faeces with all emitted gases and smoke exhausted via ducts into the surrounding environment. Whilst such devices are effective to kill bacteria and other pathogens within the faeces, they are typically very energy intensive and generate harmful NOX and SOX gases (together with carbon dioxide) that are released into the surrounding environment.

Chemical toilets collect human excreta in holding tank and use chemicals to minimise odours and in some cases initiate chemical breakdown of the excreta to inhibit the growth of harmful bacteria and pathogens. However, such toilets typically require large holding tanks and significant volumes of disinfectant and deodorising chemicals. Biocides, alcohols and ammonium-based compounds are typically used. However, the collected and chemically treated waste is required to be transported to large-scale sewage processing plants before it can be discharged safely and preferably utilised for applications such as within fertilisers.

Accordingly, there is a need for improved apparatus and methods for the safe, effective and environmentally sustainable collection and treatment of human waste particularly in deprived regions with poor sanitation facilities and connection to sewage treatment networks.

SUMMARY OF THE INVENTION

It is an objective of the present invention to provide a solid waste processing system including apparatus and method to process predominantly solid waste including, in particular, human waste (faeces) according to environmentally sustainable, effective and convenient pathways. It is a specific objective to provide a human waste processing system to process waste, including in particular solid human waste, via an energy efficient and environmentally sustainable process.

The objectives are achieved via apparatus and methods that utilises a pyrolysis process to thermally decompose solid waste and to effectively eliminate pathogens and bacteria within faeces so as to generate a safe and biologically benign product char that may be disposed of conveniently and/or used for one or more applications. Preferably, the present pyrolysis system is configured for torrefaction processing to convert generally solid biomass into a product char via a mild form of pyrolysis involving heating temperatures optionally between 200° C. to 350° C. Such a configuration is beneficial to kill pathogens and bacteria within the biomass without releasing harmful product gases such as NOX and SOX pollutants directly into the environment. The present torrefaction thermochemical treatment apparatus and method is conveniently operational at atmospheric pressure and utilises an oxygen depleted environment that is convenient and energy efficient to create and maintain.

According to a preferred embodiment, the present concept comprises a pyrolysis chamber (within which the torrefaction process is implemented) and a liquid scrubber unit coupled in fluid communication with the pyrolysis chamber to receive gases and/or moisture vapour. Such an arrangement is advantageous to avoid emission of pyrolysis product gases and vapour directly into the surrounding environment. By exhausting such gases and moisture vapour directly into the body of a scrubber liquid, the gases are captured and may be subsequently reacted and/or otherwise chemically treated via subsequent downstream liquid processing apparatus and procedures.

According to a first aspect of the present concept there is provided solid waste processing apparatus comprising: a pyrolysis unit having at least one heater and a pyrolysis chamber provided with a solid waste inlet, a solid waste outlet, a gas/moisture vapour outlet; a scrubber unit having a tank to contain a scrubber liquid and provided with a liquid outlet, a gas outlet and a gas/moisture vapour inlet coupled to the gas/moisture vapour outlet of the pyrolysis chamber.

Preferably, an aperture of the gas/moisture vapour inlet from which a gas/moisture vapour is configured to enter the tank is positioned at a first region of the tank and an aperture of the gas outlet through which a gas is configured to vent from the tank is positioned at a second region spatially separated from the first region. The scrubber tank is configured to house a scrubbing liquid into which all gases and vapour from the pyrolysis chamber are vented. In particular, the scrubber tank comprises a scrubber liquid and an aperture of the gas/moisture vapour inlet from which a gas/moisture vapour is configured to emerge within the scrubber tank is positioned submerged within the scrubber liquid and an aperture of the gas outlet through which a gas is configured to vent from the tank is positioned above and clear of the scrubber liquid. Such a configuration provides that the exhaust for gases/vapour from the pyrolysis chamber are always vented directly into the scrubber liquid. Accordingly, exhaust gases from the pyrolysis chamber are not vented directly into the environment and are vented exclusively into the scrubber liquid prior to any release into the environment.

Preferably, an aperture of the liquid outlet from which a liquid is configured to flow from the tank is positioned intermediate the aperture of the gas/moisture vapour inlet and the aperture of the gas outlet. This provides an overflow weir effect to maintain a predetermined volume of liquid within the scrubber tank. In particular, as more scrubber liquid is condensed within the tank (from oxygen and water vapour exhausted from the pyrolysis chamber) excess scrubber liquid is allowed to overflow from the liquid outlet into a downstream liquid processing facility/system. Advantageously, the scrubber liquid is replenished so as to control pH and the concentration of dissolved nitrogen and sulphur compounds that would otherwise create an acidic environment and lead to corrosion problems. In particular, and preferably, the tank is elongate and configured to collect and retain a pre-determined volume of a scrubber liquid within a lower region of the tank, the liquid outlet positioned between respective lengthwise ends of the tank to provide an overflow weir to maintain the pre-determined volume of the scrubber liquid within the tank. Optionally, the scrubber unit may further comprise a solid-phase reactive insert positioned within the tank to react chemically with a gas and/or a liquid within the tank. The reactive insert may comprise an alkaline insert configured to balance pH or other chemical composition and/or configured to neutralise or reduce the concentration of biological and/or harmful compounds emitted from the drying and/or pyrolysis process. Preferably, the gas/moisture vapour inlet is coupled directly to the gas/moisture vapour outlet exclusively via a one-way valve.

Preferably, the pyrolysis unit further comprises a waste actuator positioned within the chamber to compress and/or facilitate movement of the waste to a region of the chamber adjacent the heater. Preferably, the waste actuator is elongate and is configured to be rotatable about a longitudinal axis. Preferably, a lower region of the waste actuator comprises a radially enlarged section. Preferably, the radially enlarged section may be formed as a drum and comprises at least one helical projection extending axially and radially outward at an external facing surface of the drum. Preferably, at least a portion of the chamber and the actuator are cylindrical and separated from one another by an annular gap region, the actuator being rotatably mounted within the chamber. Preferably, the actuator and/or chamber comprise a conical section having a respective conical guide surface to facilitate movement of the solid waste into the gap region under gravity. Preferably, an external facing surface of the actuator is positioned opposite an internal facing surface of the chamber and comprises at least one helical rib extending lengthwise around the longitudinal axis of the actuator.

Preferably, the actuator is elongate and hollow and comprises an internal gas flow conduit extending from a first end towards a second end wherein the first end is open to provide an inlet of the internal gas flow conduit and positioned at or towards a lower region of the chamber, the actuator further comprising vent apertures positioned at or towards the second end of the actuator to provide an outlet of the internal gas flow conduit and enable a gas to vent from the internal gas flow conduit and into a region of the chamber surrounding the actuator.

Preferably, the apparatus further comprises a flap hingeably mounted to extend over an aperture of the solid waste inlet through which the solid waste is configured to enter the chamber wherein the flap and/or a perimeter region of an internal facing surface of the chamber surrounding the aperture is profiled via a groove and/or a projection.

Preferably, the apparatus further comprises a char collection trap coupled in internal communication to receive solid waste char from the pyrolysis chamber, the collection trap positioned below the chamber. The char collection trap is positioned immediately below a char outlet located at a lowermost terminal end of the pyrolysis chamber. Thermally decomposed solid waste is configured to fall under gravity from the waste outlet into the char collection trap.

Preferably, the heater is positioned to at least partially surround the chamber at a location adjacent the annular gap region. Optionally, the heater comprises a plurality of independent heating collars positioned circumferentially around a heating zone of the pyrolysis chamber. The heating zone is preferably positioned at a lowermost region of the pyrolysis chamber. The heating collars may be operated and controlled independently and/or collectively. The apparatus optionally comprises temperature sensors to monitor a heating temperature at the pyrolysis chamber and to regulate automatically and/or semi-automatically the heating via thermostatic control.

Optionally, the apparatus further comprises a wiper blade extending radially outward from the actuator towards an internal facing surface of the chamber. Preferably, the wiper blade is positioned in close or near touching contact with the conical guide surface and is rotatable with the actuator so as to dislodge solid matter and facilitate downward transfer into the lower heating zone.

Preferably, the pyrolysis unit comprises valves and/or seals to prevent or inhibit a flow of air into the chamber so as to provide an oxygen depleted environment within the chamber suitable for pyrolysis.

According to a further aspect of the present concept there is provided a method of solid waste processing comprising: thermally decomposing solid waste within a chamber using pyrolysis; exhausting a flow of a gas from the chamber generated by the pyrolysis into a body of a scrubber liquid contained within a scrubber tank, the scrubber tank positioned in internal fluid communication with the chamber.

Preferably, the method comprises drying the solid waste within the chamber prior to the step of thermally decomposing the solid waste, wherein a heating temperature of the step of drying is less than a heating temperature of the step of thermally decomposing the solid waste. Preferably, the method comprises collecting water within the scrubber tank during the step of drying the solid waste to generate the scrubber liquid within the tank. Water in the form or moisture vapour and oxygen are released from the solid waste during the drying step and are transferred from the pyrolysis chamber into the scrubber unit where they condense to form the scrubber liquid. This initial drying phase is advantageous to regenerate the scrubber liquid and control its chemical composition, pH and accordingly minimise corrosion and other adverse effects associated with an acidic liquid contained within a metal environment. Preferably, the pyrolysis unit and the scrubber unit are formed from a metal and optionally steel in particular stainless steel.

Optionally, the heating temperature of the step of drying is in a range 30° C. to 150° C., 40° C. to 120° C., 40° C. to 100° C. or 50° C. to 90° C.; and/or a heating temperature of the step of thermally decomposing is in a range 180° C. to 400° C., 200° C. to 400° C., 200° C. to 300° C. or 220° C. to 270° C. The step of thermally decomposing the solid matter is preferably a torrefaction process (mild form of pyrolysis) at a temperature of around or slightly above 200° C. and optionally in a range 200° C. to 320° C. Processing at this temperature range is advantageous to minimise harmful emissions from the pyrolysis unit including for example syngases in particular $NO_x$ and $SO_x$, as well as CO and $NH_3$. Additionally, torrefaction of the solid biomass has been found to be energy efficient by minimising the electrical energy required to generate high heating temperatures associated with other pyrolysis processes that typically involve temperatures in the range 310° C. to 540° C.

Preferably, during the step of drying and/or thermally decomposing the solid matter, the method further comprises compressing the solid matter within the chamber by moving the solid matter into a gap region within the chamber defined between an external facing surface of a rotating waste actuator extending within the chamber and an internal facing surface of the chamber. Preferably, the method comprises collecting thermally decomposed solid waste char within a char collection trap located below the chamber by allowing the solid waste char to fall under gravity into the char collection trap.

Preferably, gas and/or moisture vapour generated within the chamber is exhausted exclusively into the body of the scrubber liquid prior to any exhausting of a gas and/or moisture vapour from the scrubber tank.

Preferably, a flow pathway of the gas and/or moisture vapour from the chamber to the scrubber liquid is via an internal passageway within the rotatable waste actuator extending centrally through the chamber and about which the solid waste is compressed and heated; and/or the gas and/or moisture vapour is exhausted into the scrubber liquid at or toward a bed of the liquid such that the gas and/or moisture vapour travels upwardly against gravity through the scrubber liquid; and wherein the gas and/or moisture vapour is exhausted from the scrubber tank at or towards an upper region or roof of the scrubber tank.

According to a further aspect of the present concept there is provided pyrolysis apparatus to process solid waste comprising: a pyrolysis chamber provided with a solid waste inlet, a solid waste outlet and a gas/moisture vapour outlet; at least one heater to heat the chamber; and a solid waste actuator rotatably mounted within the chamber and having an external facing surface positioned opposed to an internal facing surface of the chamber to define an annular gap region therebetween to receive the solid waste; wherein the heater is positioned at or in close proximity to the annular gap region.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
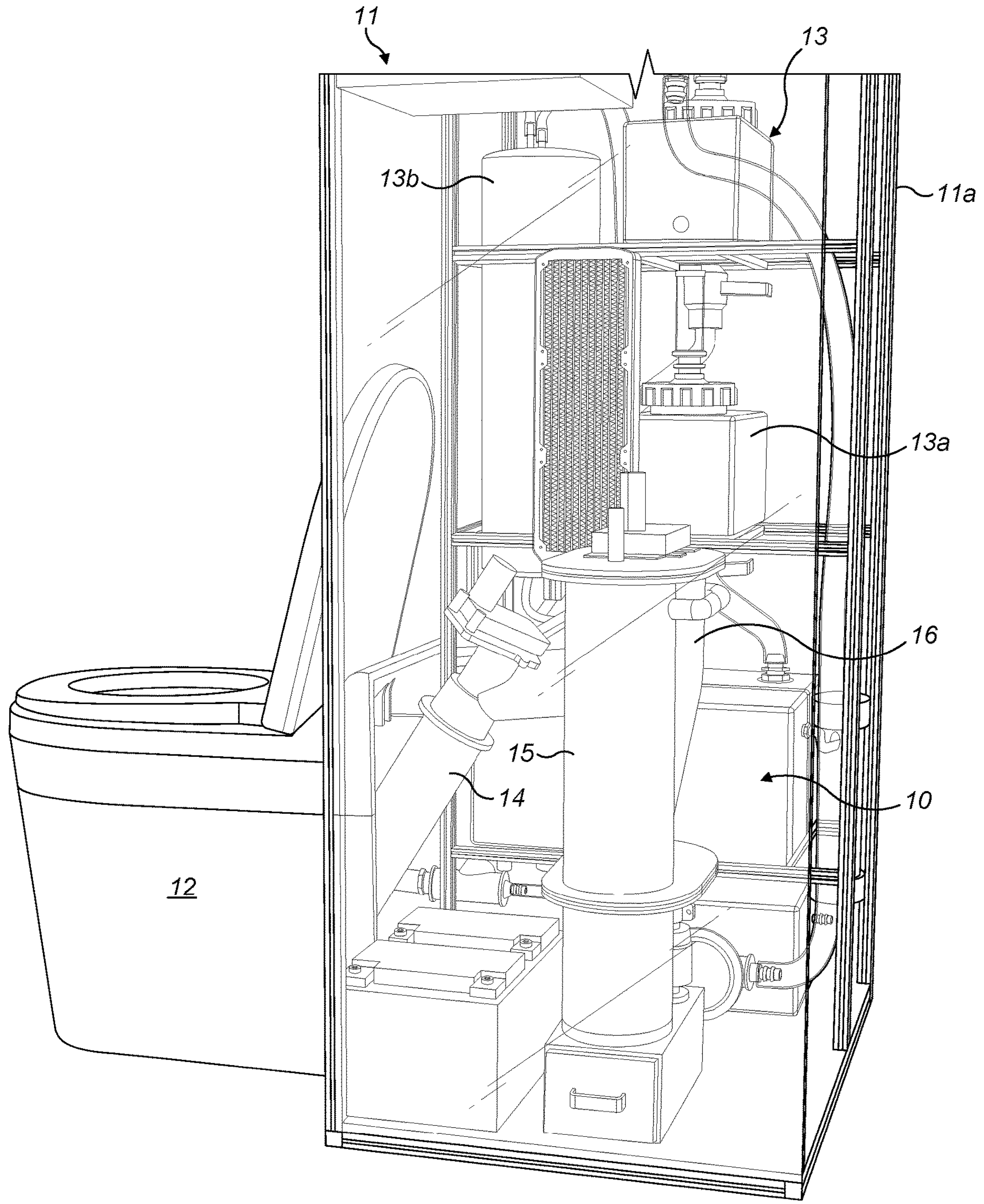
FIG. 1 is a perspective view of a part of a pyrolysis and emission scrubber unit integrated within a modular toilet assembly configured for the processing of solid and liquid human waste according to a specific implementation.

A toilet module 11 for the treatment and processing of human solid and liquid waste comprises a frame 11*a* supporting a variety of modular components including a front end toilet 12; a pyrolysis and emission scrubber module 10; a solid and liquid transporter 14 coupled between the toilet 12 and the pyrolysis and emission scrubber module 10; a liquid treatment module illustrated generally by reference numeral 13 comprising a plurality of tanks 13*a* and at least one filtration module 13*b*. The pyrolysis and emission scrubber module 10 comprises an emission scrubber 15 and a pyrolysis unit 16. In use, solid and liquid waste is deposited within the toilet 12 following which it is transported to the pyrolysis and emission scrubber module 10 via transporter 14 (configured to separate solid waste and liquid waste). Solid waste is transported to module 10 whilst liquid waste is transported to the liquid treatment module 13. Treated liquid and solid waste may then be collected, disposed of and/or used for downstream applications and processes. The entire module 11 may be installed within stationary or mobile environments. In particular, the present system, apparatus and methods are configured for processing human solid and liquid waste without requiring an additional supply of liquid (for flushing purposes) and connection to a sewage outlet/network. Accordingly, the present apparatus and methods are adapted for installation and operation within a building or within a transport carriage that is not provided with a tanked or fresh waste supply and/or connection to a sewage network/treatment facility.

Figure 2A:
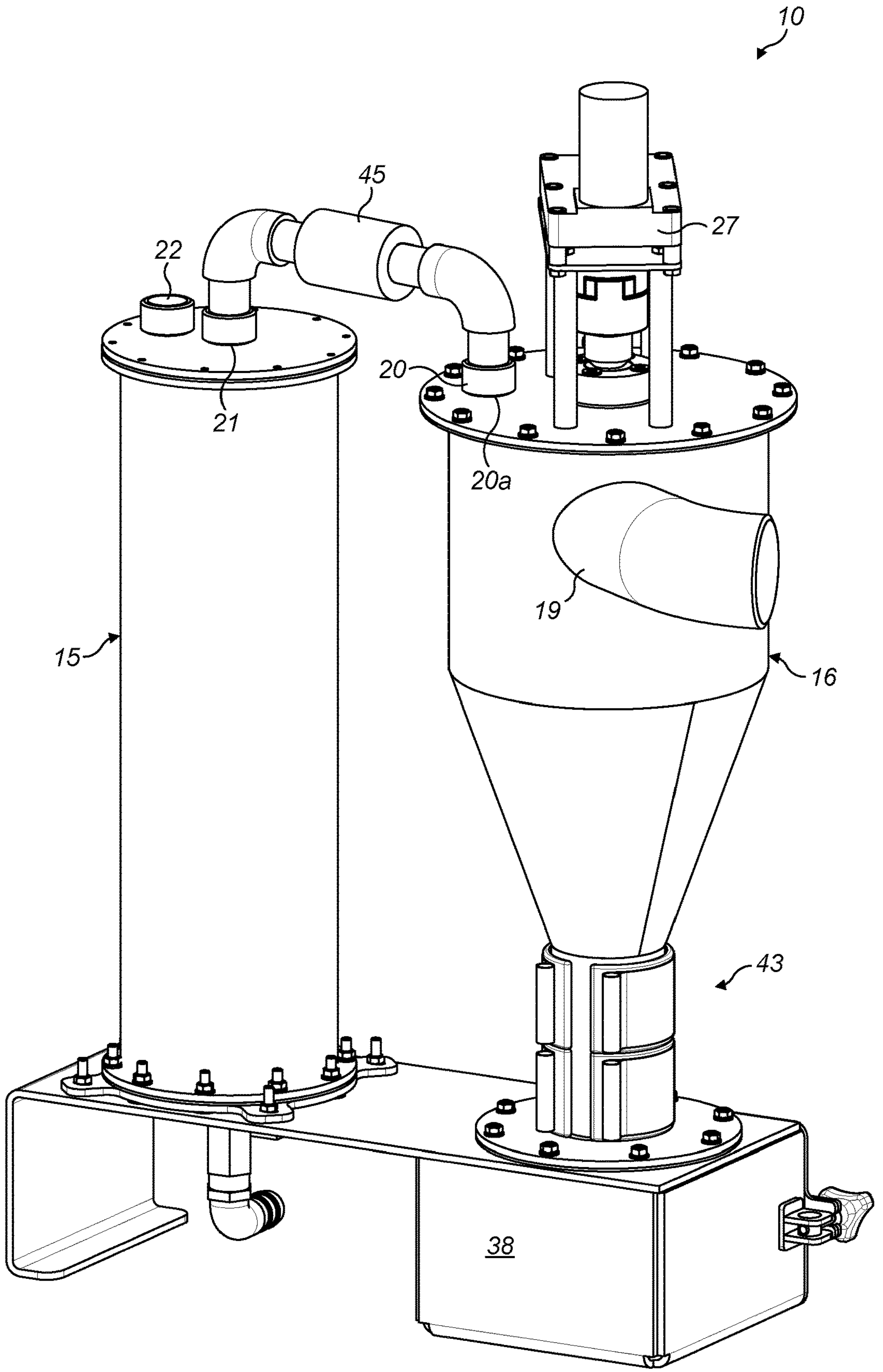
FIG. 2A is a perspective view of a pyrolysis and emission scrubber module forming part of the toilet module of FIG. 1.
Figure 2B:
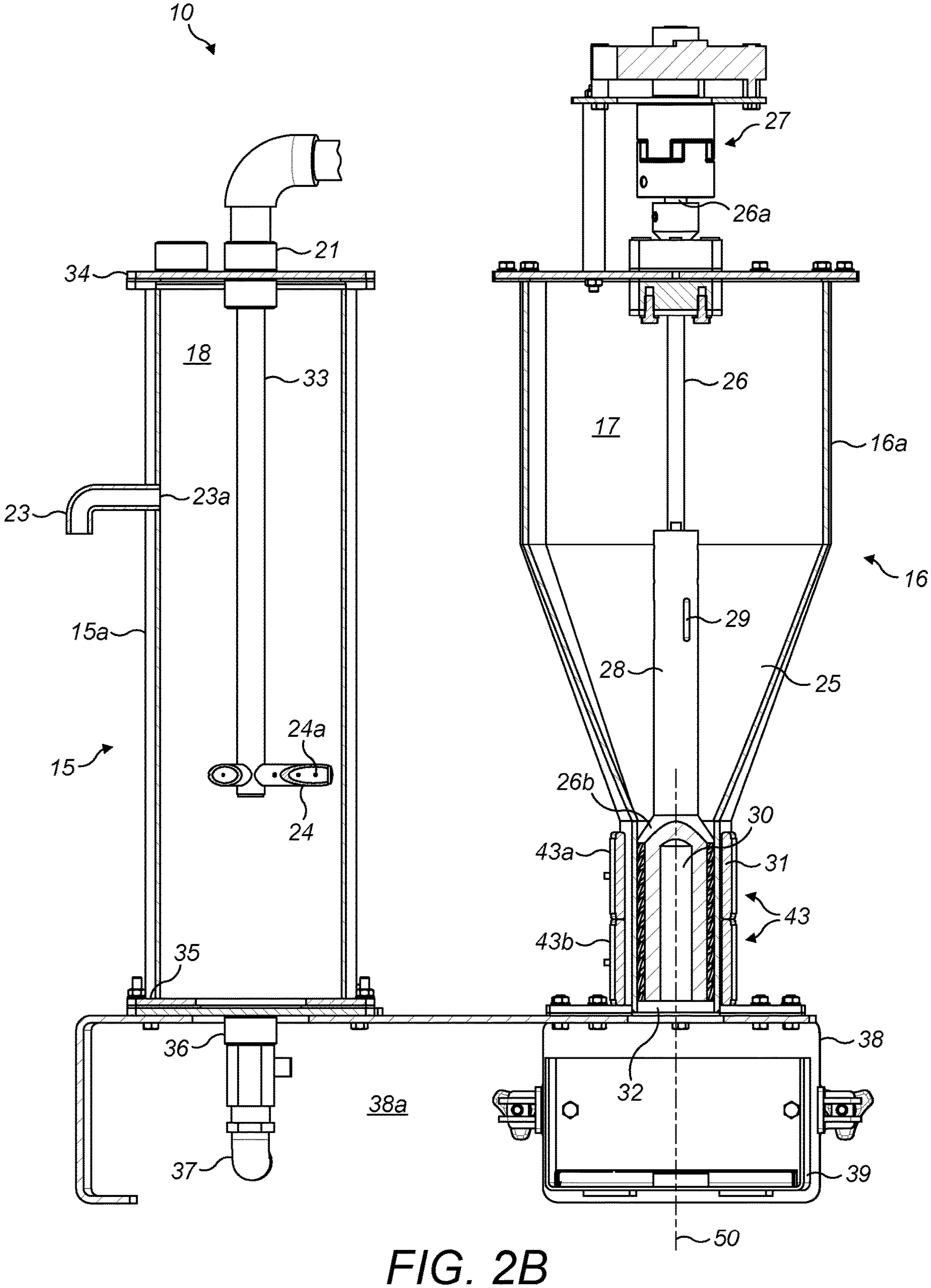
FIG. 2B is a cross sectional view of the pyrolysis and emission scrubber module of FIG. 2A.

Referring to FIG. 2A, the pyrolysis and emission scrubber module 10 is configured specifically for the processing and treatment of predominantly solid waste (faeces/faecal matter). The primary components of the module 10 comprise the pyrolysis unit 16, the emission scrubber 15, a char collection trap 38, a heater 43, a gas/moisture vapour conduit 45 providing fluid communication between the pyrolysis unit 16 and the emission scrubber 15 in addition to various inlets and outlets, as described herein. In particular, and referring to FIGS. 2A and 2B, the emission scrubber 15 comprises a liquid containment tank 15*a*. Tank 15*a* and chamber 18 are elongate and comprise a first upper end 34 and a second lower end 35. Lower end 35 is mounted to char collection trap 38 that provides a support or mounting platform. Pyrolysis unit 16 is also coupled to the char collection trap 38 such that both units 16, 15 are mounted side-by-side.

The emission scrubber 15 comprises a gas/moisture vapour inlet defined generally by reference 21. Inlet 21 comprises an elongate inlet tube 33 that extends from the first upper end 34 towards second lower end 35. A lower terminal end of tube 33 comprises a radial flange 24 having a series of apertures 24*a*. Flange 24 is accordingly positioned in a lower half of chamber 18 closer towards second lower end 35 relative to first upper end 34. Tank 15*a* also comprises a liquid outlet 23 in which an aperture 23*a* of liquid outlet 23 is positioned coplanar with the cylindrical wall of tank 15*a* that defines internal chamber 18. Liquid outlet 23 is positioned in a lengthwise direction between ends 34, 35 just above a mid-length position so as to be in an upper half of tank 15*a* and chamber 18. Emission scrubber 15 also comprises a gas/moisture vapour outlet indicated generally by reference 22 located at the first upper end 34. Accordingly, the gas/moisture vapour inlet 21, and in particular an inlet aperture 24*a* of inlet 21, is positioned towards or in close proximity to the second lower end 35 whilst the gas/moisture vapour outlet 22 is positioned at or in close proximity to first upper end 34. Liquid outlet 23 is positioned in a lengthwise direction intermediate inlet aperture 24*a* and gas outlet 22.

Figure 3:
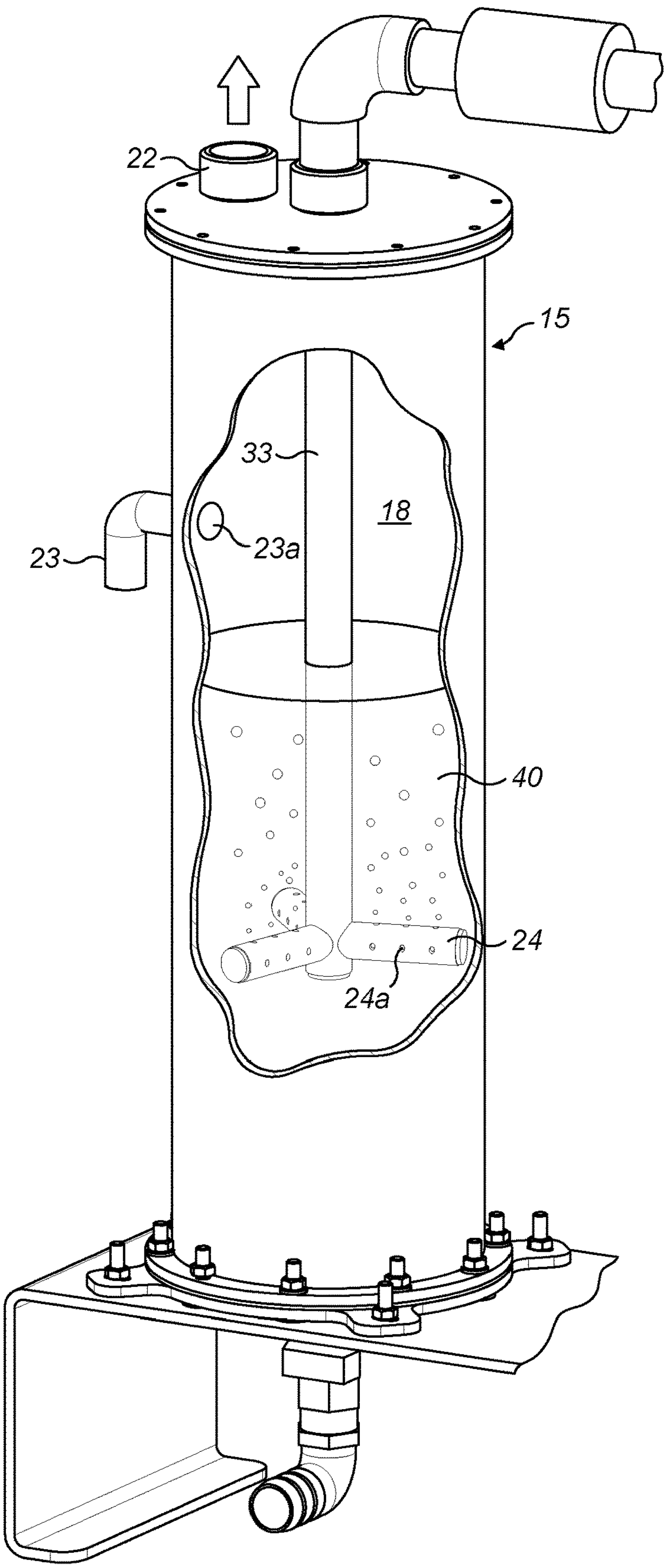
FIG. 3 is a perspective view of the emission scrubber unit of the module of FIG. 2B with selected components removed for illustrative purposes.

Referring to FIG. 3, emission scrubber 15 is configured to collect and contain a scrubber liquid 40 occupying a lower region of the tank 15*a*. Accordingly, flange 24 and gas inlet aperture 24*a* is configured to be submerged within the scrubber liquid 40.

Referring again to FIGS. 2A, 2B, 4 and 5, pyrolysis unit 16 comprises a vessel 16*a* defining an internal chamber 17. An upper region of chamber 17 is generally cylindrical whilst a lower region of chamber 17 is generally conical defining an internal conical guide surface 25. At a region below guide surface 25, chamber 17 comprises a radially reduced cylindrical section that in turn defines a lower heating zone 31 of the pyrolysis unit 16. Zone 31 is surrounded by a heating jacket 43. According the specific implementation, heater (heating jacket) 43 is divided into a lower heating collar 43*b* and an upper heating collar 43*a* with both collars 43*a*, 43*b* axially and circumferentially encapsulating zone 31. Zone 31 is positioned immediately above and in internal communication with char collection trap 38.

Pyrolysis unit 16 also comprises an internal waste actuator indicated generally by reference 26. Actuator 26 is generally elongate and comprises a first end 26*a* that projects upwardly from vessel 16*a* and is mounted within an electric motor indicated generally by reference 27. An opposite second end of actuator 26 is radially enlarged relative to the actuator main length to define an actuating drum 30, rotatably mounted within zone 31. An upper end of drum 30 comprises a conical section 26*b* tapering radially inward towards the main length of actuator 26 and in opposite tapered relationship relative to the radially inward tapered surface 25 extending from the upper cylindrical section of vessel 16*a*. Actuator 26 is hollow to comprise an internal bore 28 extending over at least half of its lower length from a lower end 32 through zone 31, conical section 25 and into the upper cylindrical section. At least one vent port 29 provide fluid communication with the internal chamber 17 and the internal bore 28 for the passage of gas.

Figure 4:
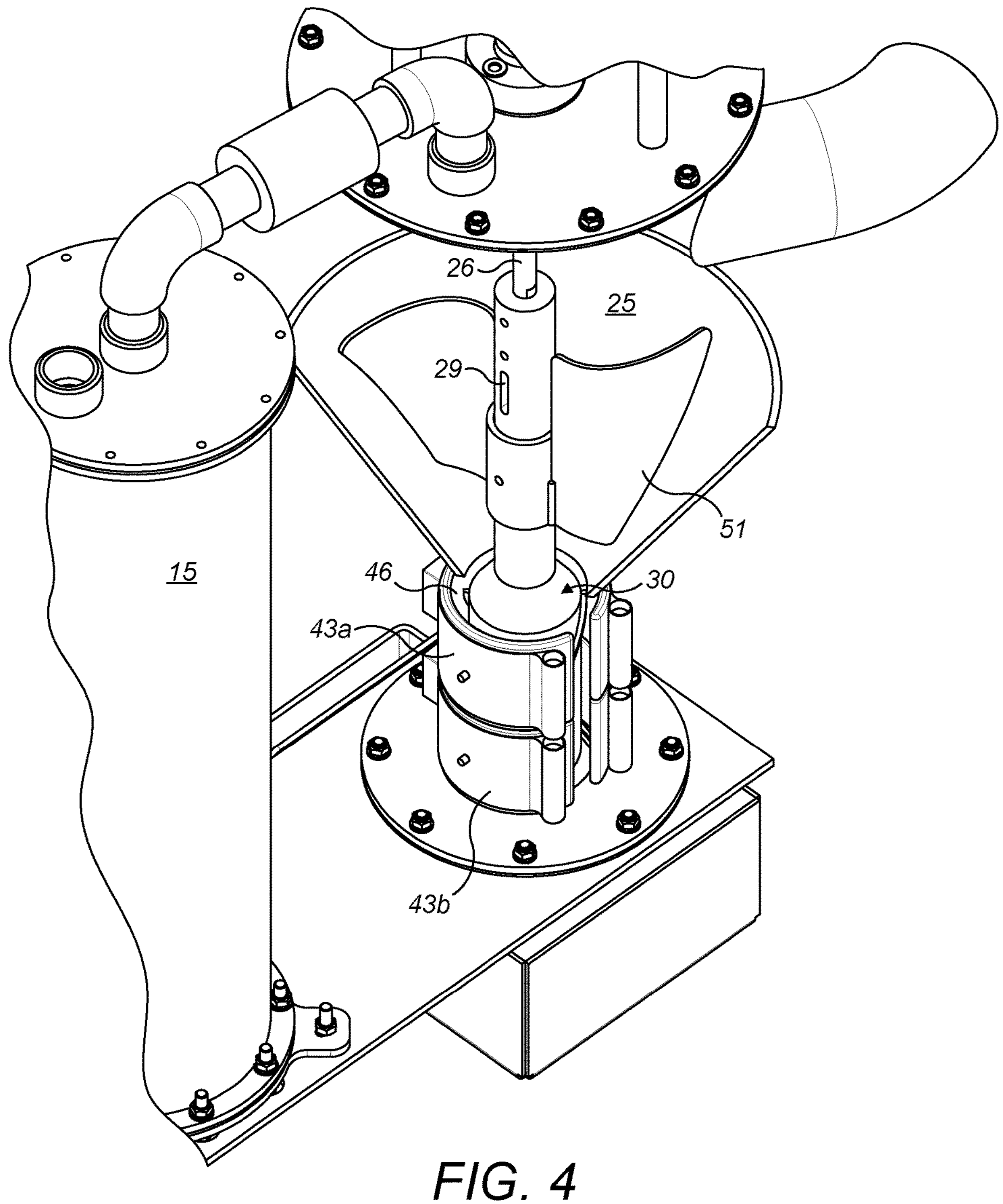
FIG. 4 is a perspective view of the pyrolysis unit of the module of FIG. 2B with selected components removed for illustrative purposes.
Figure 5:
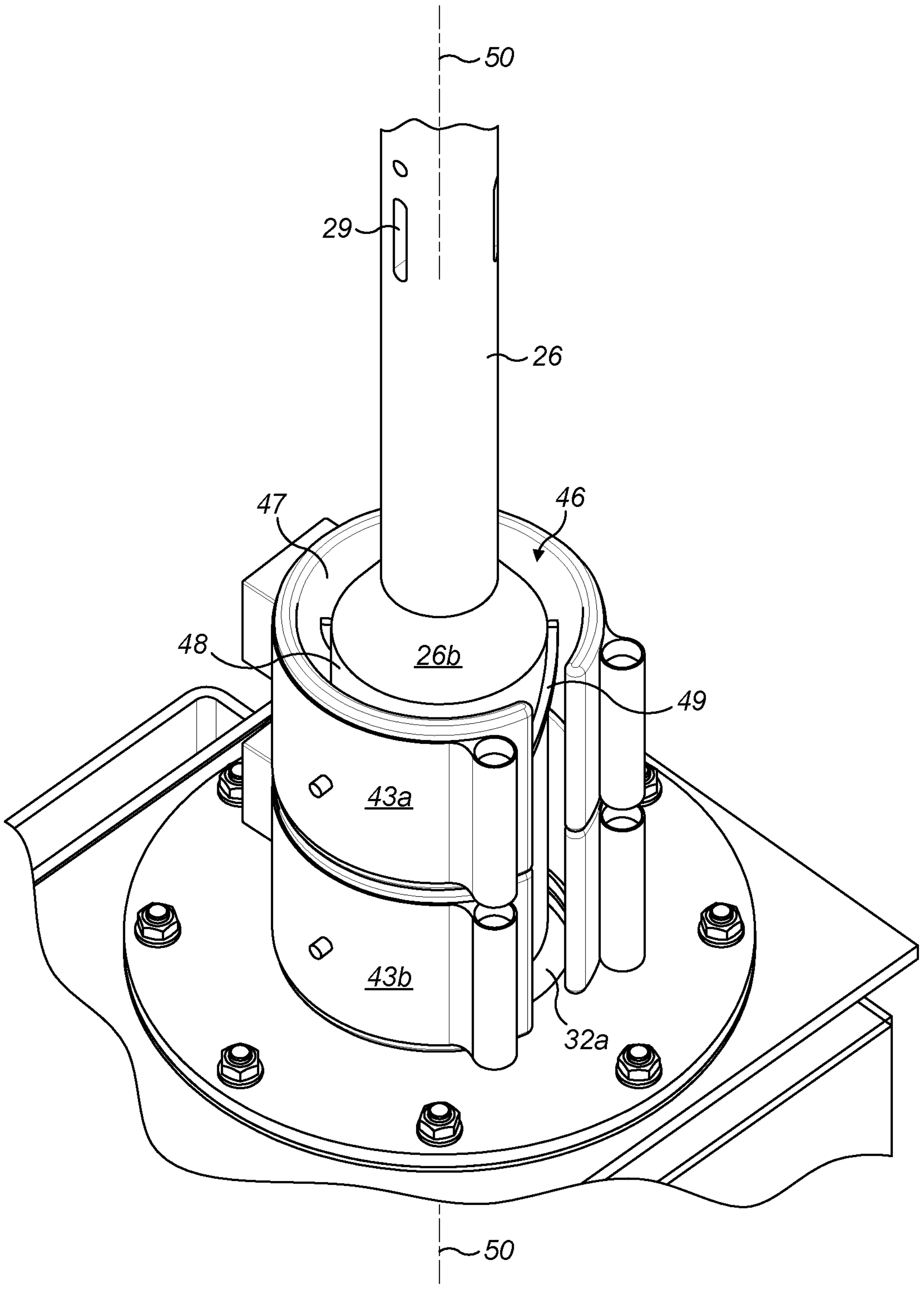
FIG. 5 is a perspective view of a lower region of the pyrolysis unit of the module of FIG. 2B with selected components removed for illustrative purposes.

Referring specifically to FIGS. 4 and 5, at least one helical rib 49 projects radially outward from an external facing surface 48 of drum 30, with rib 49 extending helically about a longitudinal rotational axis 50 of actuator 26. Vessel 16*a* at the heating zone 31 comprises a corresponding cylindrical internal facing surface 47 so as to create an annular gap region indicated generally by reference 46 between the respective cylindrical surfaces 48 and 47. The at least one helical rib 49 projects radially into the gap region 46 from drum 30. An annular aperture 32*a* is defined between a lengthwise lower terminal end of drum 30 and the corresponding lengthwise lower terminal end of zone 31 corresponding approximately to an upper surface of char collection trap 38. Accordingly, aperture 32*a* provides internal communication between an internal chamber 38*a* of trap 38 and internal chamber 17 of vessel 16*a*. Char collection trap 38 comprises a removable tray 39 for removing char deposited in trap 38 from chamber 17.

Figure 6:
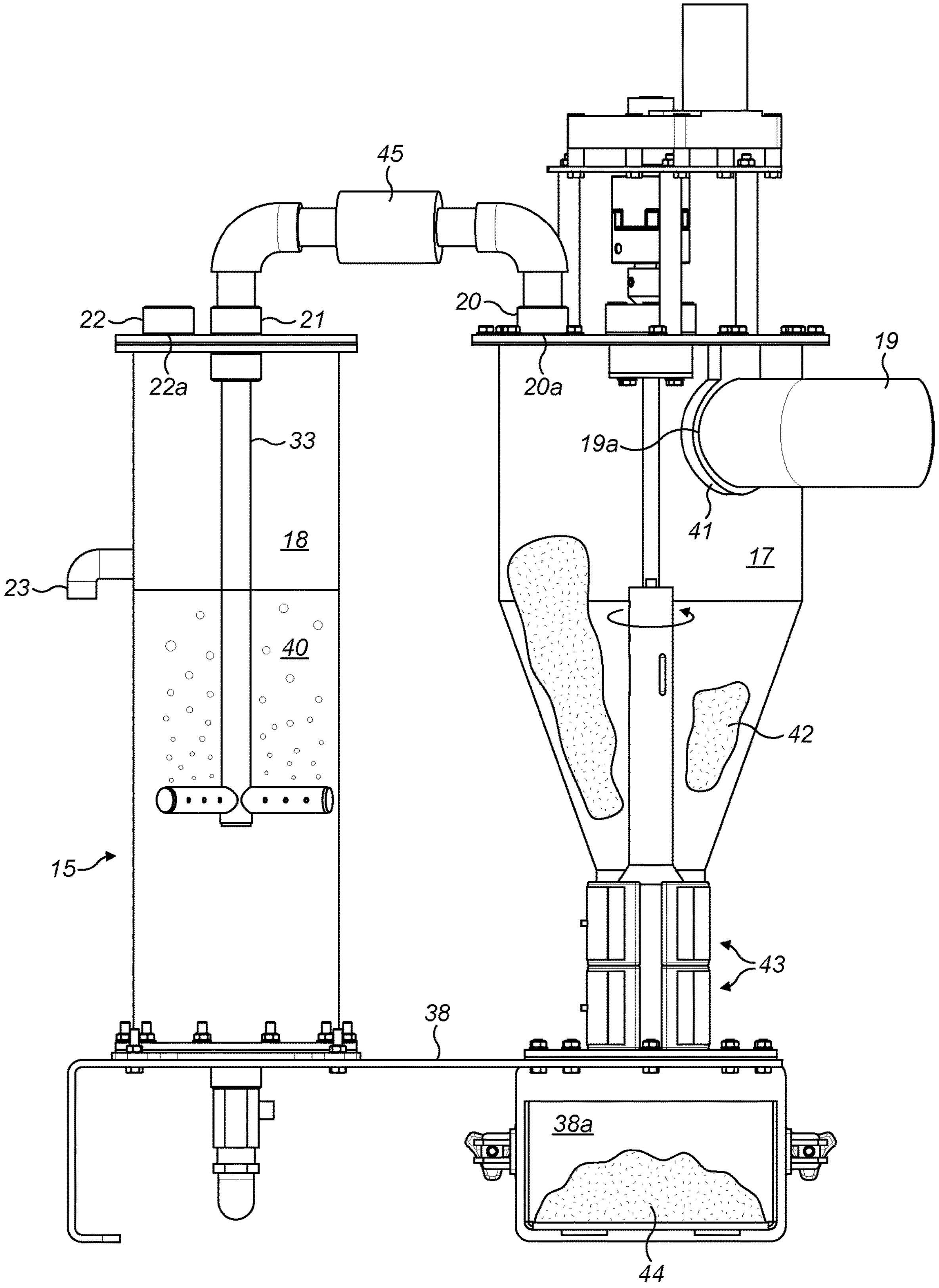
FIG. 6 is a cross sectional view through the module of FIG. 2B according to a specific implementation.

Pyrolysis unit 16 further comprises a solid matter inlet port 19 and a gas/moisture vapour outlet 20. Solid matter inlet 19, referring to FIG. 6, comprises an inlet aperture 19*a* from which solid matter is configured to be deposited within chamber 17. A hingeably mounted flap 41 is positioned to extend across aperture 19*a* and is forced to hinge open as solid matter is transported towards and through inlet 19/inlet aperture 19*a*. As illustrated in FIGS. 2A and 6, solid waste inlet 19 is positioned towards an upper end of vessel 16*a* such that solid matter (indicated generally by reference 42) falls downwardly under gravity towards and in contact with conical guide surface 25. Gas/moisture vapour outlet 20 also comprises an outlet aperture 20*a* positioned at or near the upper end of vessel 16*a*.

In use, predominantly solid waste matter is transported from toilet 12 via transporter 14 to the pyrolysis emission scrubber module 10. The solid matter is received at the pyrolysis unit 16 via inlet 19. Predominant solid matter 42 is then deposited within chamber 17 to fall under gravity and collect at the generally funnel shaped guide surface 25. Unit 16 may comprise suitable electronic sensors (for example motion, moisture, pressure, contact, temperature sensors etc) to provide/facilitate actuation of motor 27 and a corresponding rotation of actuator 26 within chamber 17 about axis 50. Accordingly, drum 30 is configured to rotate within zone 31. Solid matter 42 via the conical guide surface 25 is encouraged to fall under gravity into the annular region 46 between drum 30 and jacket heater 43. During this initial stage, at least one of the heating collars 43*a*, 43*b* is actuated to provide modest heating of the solid matter 42 within chamber 17 and in particular any solid matter within gap region 46. Alternatively, at least one of the heating collars 43*a*, 43*b* may be actuated so as to providing heating of gap region 46 and internal chamber 17 prior to rotational drive of actuator 26. In a preferred implementation, actuator 26 is rotated counter clockwise so as to provide a 'churn' effect on the solid matter 42 with the helical rib 49 inhibiting downward movement of the solid matter 42 through the heating zone 31.

This initial drying phase is preferably operated at around 70° C. and is configured to remove water and oxygen within solid matter 42. Importantly, restricting this drying process to not more than 70° C. is advantageous to avoid release of nitrogen and sulphur compounds from the solid matter 42. This initial drying phase may be undertaken for 30 minutes to 2 hours whilst actuator 26 is rotated counter clockwise. Oxygen and water vapour are driven from chamber 17 through the gas outlet 20, conduit 45 and tube 33 to be exhausted into the scrubber liquid 40 via aperture 24*a*. In a preferred implementation, scrubber 15 may be 'primed' with a scrubber liquid for example by introducing a predefined volume of liquid into tank 15*a*. The initial drying phase of the present concept is further advantageous to replenish the scrubber liquid 40 within tank 15*a* and in particular to dilute the scrubber liquid 40 with freshwater condensate. This pre-pyrolysis heating phase (at the modest temperature below that of the subsequent pyrolysis heating phase) is beneficial to firstly maintain a predefined volume of scrubber liquid 40 within tank 15*a* and also to inhibit the scrubber liquid 40 becoming too acidic due to elevated concentrations of nitrogen and sulphur containing compounds. Importantly, as inlet aperture 24*a* of the scrubber 15 is submerged within scrubber liquid 40 oxygen, water vapour and any product gases driven and released from solid matter 42 during this drying phase (and the subsequent torrefaction phase) are exhausted directly into the scrubber liquid 40 where they are at least partially solvated/dissolved. As indicated, the volume of scrubber liquid 40 is maintained at a predetermined level via the presence and position of liquid outlet 23 positioned intermediate inlet aperture 24*a* and the gas/moisture vapour outlet 22.

Pyrolysis within chamber 17 is achieved via appropriate fluid seals and valves at the various inlet and outlet ports. In particular, solid waste inlet port 19 (having hinge flap 41) comprises a perimeter region (not shown) that is profiled so as to sit in close fitting contact with aperture 19*a* and provide a fluid seal. Additionally, solid matter transported to the inlet 19 acts as a 'bung' to effectively inhibit the ingress of oxygen at chamber 17. As chamber 17 is provided in open fluid communication with char collection trap 38 and in particular trap chamber 38*a*, trap 38 comprises appropriate seals (not shown) again to prevent oxygen ingress into chamber 17. A one-way valve (not shown) is provided within conduit 45 to prevent the return-flow of gas, in particular oxygen and water vapour, from the scrubber 15 into chamber 17. Appropriate seals are also provided around actuator 26 at first end 26*a* of mounting at the external drive motor 27.

As the initial drying phase approaches completion, the predetermined volume of scrubber liquid 40 within tank 15*a* is achieved with any excess scrubber liquid allowed to drain via the liquid outlet 23. Any excess liquid may then be supplied to the liquid treatment module 13 including filtration unit 13*b*. As indicated, this is effective to maintain a predetermined pH and to minimise the accumulation of dissolved nitrogen and sulphur compounds within scrubber liquid 40. Scrubber 15 also comprises a liquid drain outlet 36 and conduit 37 for connection to an output tank or liquid treatment module 13. This is useful to empty tank 15*a* for maintenance purposes or to completely refresh the scrubber liquid 40.

Once substantially all the oxygen and moisture is expelled from the solid waste 42, the system is then adapted to the second pyrolysis phase. Actuator 26 is rotated in a clockwise direction to facilitate downward movement of the dried solid waste 42 into the heating zone 31. A scrapper 51 extends radially outward from the elongate main shaft of actuator 26 repositioned in near or close touching contact with conical surface 25 so as to contact solid matter 42 as actuator 26 is rotated. The rotational speed of actuator 26 is controlled such that when combined with gravity, the solid waste 42 is transported at a predetermined speed in a downward direction through the heating zone 31 as the heating collars 43*a*, 43*b* are actuated. The present system is configured specifically for the controlled heating of the solid matter 42 to inhibit/minimise the generation of harmful Syngas gas emissions including $NO_x$, $SO_x$, CO and $NH_3$. The minimised emission of these gases is achieved by a combination of the exhausting of all product gases into the scrubber liquid 40 and a configuration of the heating zone 31 and the method/parameters by which the solid matter 42 is heated within chamber 17 and in particular zone 31. Preferably, the present system is configured for the torrefaction of the solid waste 42 being a mild form of pyrolysis. Preferably, the heating collars 43*a*, 43*b* are actuated to achieve a heating temperature of less than 250° C. and preferably a heating temperature of around 200° C. being sufficient to destroy bacteria and viruses within solid matter 42. As the solid matter falls under gravity into the heating zone 30 it is transported downwardly to the annular aperture 32*a* by helical rib 49. Gases generated from the heating of the biomass 42 are also pushed downwardly through the annular heating zone 31. These gases flow via annular aperture 32*a* into the hollow open end and interior of actuator drum 30 to then flow upwardly through bore 28 where they are vented into chamber 17 via vents 29. Providing this exhaust gas pathway from the annular heating zone 31 internally through the drum 30 and actuator 26 prevents blockage of the downward movement of the biomass 42 within the annular heating zone 31 that may otherwise occur due to pressure build-up at this region.

The gases generated from the torrefaction of the biomass 42 are exhausted directly into the scrubber liquid 40 via aperture 24*a* that is submerged within liquid 40. Any $NO_x$, $SO_x$, CO and $NH_3$ generated from the torrefaction are at least partially absorbed by scrubber liquid 40. Optionally, an alkaline mesh or brick insert may be mounted within tank 15*a* to counter the reducing pH levels resultant from the absorbed gases. Additionally, a similar filter insert may be provided at the upper region of chamber 18 internally or externally relative to gas/moisture vapour outlet 22 so as to provide a scrubbing of any gases vented from chamber 18. Optionally, the scrubber 15 may comprise a carbon or activated carbon/charcoal scrubber cartridge.

The biomass 42 having been heated continuously whilst being transported axially downward through the annular heating zone 31 is then deposited as char 44 into the char collection chamber 38*a*. This char 44 falls under gravity from annular aperture 32*a* and is also encourages to move downwardly and be expelled from zone 31 via the helical rib 49 that effective to maintain a modest agitation of the solid matter 42 within the heating zone 31. The char 44 may then be removed from trap chamber 38*a* via a removable tray and door (not shown) provided at trap 38.

The drying and pyrolysis (torrefaction) sequential stages may then be repeated to replenish and dilute the scrubber liquid 40 (by condensation of water vapour within chamber 17) and to thermally decompose the biomass 42. The present system is advantageous to regenerate and replenish the scrubber liquid 40 via the initial drying phase whilst also destroying bacteria and viruses within the biomass 42 during the subsequent low temperature pyrolysis. The present system via maximum heating temperatures of the order of around 200° C. is energy efficient and adapted to control and minimises harmful gas emissions such as $NO_x$, $SO_x$, CO and $NH_3$.

The invention claimed is:

1. Solid waste processing apparatus comprising:

a pyrolysis unit having at least one heater and a pyrolysis chamber provided with a solid waste inlet, a solid waste outlet, a gas/moisture vapour outlet;

a scrubber unit having a tank to contain a scrubber liquid and provided with a liquid outlet, a gas outlet and a gas/moisture vapour inlet coupled to the gas/moisture vapour outlet of the pyrolysis chamber;

a one-way valve provided at a conduit providing fluid communication between the pyrolysis unit and the scrubber unit, the valve configured to prevent the return-flow of gas from the scrubber unit into pyrolysis unit; and wherein the tank comprises a scrubber liquid and an aperture of the gas/moisture vapour inlet from which a gas/moisture vapour is configured to enter is positioned submerged within the scrubber liquid and an aperture of the gas outlet through which a gas is configured to vent from the tank is positioned above and clear of the scrubber liquid.

2. The apparatus as claimed in claim 1 wherein an aperture of the gas/moisture vapour inlet from which a gas/moisture vapour is configured to enter the tank is positioned at a first region of the tank and an aperture of the gas outlet through which a gas is configured to vent from the tank is positioned at a second region spatially separated from the first region.

3. The apparatus as claimed in claim 2 wherein an aperture of the liquid outlet from which a liquid is configured to flow from the tank is positioned intermediate the aperture of the gas/moisture vapour inlet and the aperture of the gas outlet.

4. The apparatus as claimed in claim 1 wherein the tank is elongate and configured to collect and retain a pre-determined volume of a scrubber liquid within a lower region of the tank, the liquid outlet positioned between respective lengthwise ends of the tank to provide an over-flow weir to maintain the pre-determined volume of the scrubber liquid within the tank.

5. The apparatus as claimed in any preceding claim 1 wherein the scrubber unit further comprises at least one solid-phase reactive insert positioned within the tank to react chemically with a gas and/or a liquid within the tank.

6. The apparatus as claimed in claim 1 wherein the gas/moisture vapour inlet is coupled directly to the gas/moisture vapour outlet exclusively via the one-way valve.

7. The apparatus as claimed in claim 1 wherein the pyrolysis unit further comprises a waste actuator positioned within the chamber to compress and/or facilitate movement of the waste to a region of the chamber adjacent the heater.

8. The apparatus as claimed in claim 7 wherein at least a portion of the chamber and the actuator are cylindrical and separated from one another by an annular gap region, the actuator being rotatably mounted within the chamber.

9. The apparatus as claimed in claim 8 wherein the actuator and/or chamber comprise a conical section having a respective conical guide surface to facilitate movement of the solid waste into the gap region under gravity.

10. The apparatus as claimed in claim 7 wherein an external facing surface of the actuator is positioned opposite an internal facing surface of the chamber and comprises at least one helical rib extending lengthwise around the longitudinal axis of the actuator.

11. The apparatus as claimed in claim 1 wherein the actuator is elongate and hollow and comprises an internal gas flow conduit extending from a first end towards a second end wherein the first end is open to provide an inlet of the internal gas flow conduit and positioned at or towards a lower region of the chamber, the actuator further comprising vent apertures positioned at or towards the second end of the actuator to provide an outlet of the internal gas flow conduit and enable a gas to vent from the internal gas flow conduit and into a region of the chamber surrounding the actuator.

12. The apparatus as claimed in claim 1 further comprising a flap hingeably mounted to extend over an aperture of the solid waste inlet through which the solid waste is configured to enter the chamber wherein the flap and/or a perimeter region of an internal facing surface of the chamber surrounding the aperture is profiled via a groove and/or a projection.

13. The apparatus as claimed in claim 1 further comprising a char collection trap coupled in internal communication to receive solid waste char from the pyrolysis chamber, the collection trap positioned below the chamber.

14. The apparatus as claimed in claim 8 wherein the heater is positioned to at least partially surround the chamber at a location adjacent the annular gap region.

15. The apparatus as claimed in claim 1 further comprising a wiper blade extending radially outward from the actuator towards an internal facing surface of the chamber.

16. The apparatus as claimed in claim 1 wherein the pyrolysis unit comprises valves and/or seals to prevent or inhibit a flow of air into the chamber so as to provide an oxygen depleted environment within the chamber suitable for pyrolysis.

17. A method of solid waste processing comprising:

thermally decomposing solid waste within a chamber using pyrolysis;

providing a scrubber liquid within a scrubber tank having a gas/moisture vapor inlet connected to the chamber and an aperture of the pas/moisture vapour inlet from which a gas/moisture vapour is configured to enter is positioned submerged within the scrubber liquid; and exhausting a flow of a gas from the chamber generated by the pyrolysis into a body of the scrubber liquid contained within the scrubber tank via a one-way valve configured to prevent a return-flow of gas from the scrubber tank into the chamber, the scrubber tank positioned in internal fluid communication with the chamber via the one-way valve.

18. The method as claimed in claim 17 further comprising drying the solid waste within the chamber prior to the step of thermally decomposing the solid waste, wherein a heating temperature of the step of drying is less than a heating temperature of the step of thermally decomposing the solid waste.

19. The method as claimed in claim 18 further comprising collecting water within the scrubber tank during the step of drying the solid waste to generate the scrubber liquid within the tank.

20. The method as claimed in claim 19 comprising maintaining a pre-determined volume of water within the tank by allowing excess water to exit the tank via a liquid outlet positioned to provide a weir arrangement at the tank.

21. The method as claimed in claim 18 wherein the heating temperature of the step of drying is in a range 30° C. to 150° C.; and/or a heating temperature of the step of thermally decomposing is in a range 180° C. to 400° C.

22. The method as claimed in claim 18 wherein during the step of drying and/or thermally decomposing the solid matter, the method further comprises compressing the solid matter within the chamber by moving the solid matter into a gap region within the chamber defined between an external facing surface of a rotating waste actuator extending within the chamber and an internal facing surface of the chamber.

23. The method as claimed in claim 17 comprising collecting thermally decomposed solid waste char within a char collection trap located below the chamber by allowing the solid waste char to fall under gravity into the char collection trap.

24. The method as claimed in claim 17 wherein gas and/or moisture vapour generated within the chamber is exhausted exclusively into the body of the scrubber liquid prior to any exhausting of a gas and/or moisture vapour from the scrubber tank.

25. The method as claimed in claim 17 wherein a flow pathway of the gas and/or moisture vapour from the chamber to the scrubber liquid is via an internal passageway within the rotatable waste actuator extending centrally through the chamber and about which the solid waste is compressed and heated; and/or the gas and/or moisture vapour is exhausted into the scrubber liquid at or toward a bed of the liquid such that the gas and/or moisture vapour travels upwardly against gravity through the scrubber liquid; and wherein the gas and/or moisture vapour is exhausted from the scrubber tank at or towards an upper region or roof of the scrubber tank.

* * * * *